(12) United States Patent
Dorshimer et al.

(10) Patent No.: US 9,023,155 B2
(45) Date of Patent: May 5, 2015

(54) ENGINE WASH APPARATUS AND METHOD—MANIFOLD

(75) Inventors: Kurt Dorshimer, Fayetteville, GA (US);
Robert M. Rice, Huntsville, AL (US);
Sebastian Nordlund, Solna (SE);
Wayne Zadrick, Bristol, CT (US)

(73) Assignee: EcoServices, LLC, Farmington, CT (US)

( * ) Notice: Subject to any disclaimer, the term of this patent is extended or adjusted under 35 U.S.C. 154(b) by 469 days.

(21) Appl. No.: 13/562,980

(22) Filed: Jul. 31, 2012

(65) Prior Publication Data
US 2014/0034092 A1 Feb. 6, 2014

(51) Int. Cl.
*B08B 9/093* (2006.01)
*B08B 9/34* (2006.01)
*B64F 5/00* (2006.01)
*F01D 25/00* (2006.01)

(52) U.S. Cl.
CPC ............ *B64F 5/0018* (2013.01); *F01D 25/002* (2013.01)

(58) Field of Classification Search
USPC ............... 134/22.1, 22.18, 32, 33, 37, 167 R, 134/169 A, 199; 60/33.53, 801
See application file for complete search history.

(56) References Cited

U.S. PATENT DOCUMENTS

| | | | |
|---|---|---|---|
| 3,623,668 A | 11/1971 | Freid | |
| 4,196,020 A | 4/1980 | Hornak et al. | |
| 5,011,540 A | 4/1991 | McDermott | |
| 5,868,860 A | 2/1999 | Asplund | |
| 6,630,198 B2 | 10/2003 | Ackerman et al. | |
| 6,932,093 B2 | 8/2005 | Ogden et al. | |
| 7,243,665 B1 | 7/2007 | Turner et al. | |
| D548,899 S | 8/2007 | Asplund | |
| 7,445,677 B1 * | 11/2008 | Asplund | 134/24 |
| 7,497,220 B2 | 3/2009 | Asplund et al. | |
| 7,815,743 B2 | 10/2010 | Asplund et al. | |
| 2006/0219269 A1 | 10/2006 | Rice et al. | |
| 2007/0028947 A1 | 2/2007 | Erickson et al. | |

FOREIGN PATENT DOCUMENTS

WO WO 96/40453 A1 12/1996

OTHER PUBLICATIONS

International Search Report and Written Opinion from PCT Application Seial No. PCT/US2013/052945, dated Nov. 1, 2013, 10 pages.

* cited by examiner

*Primary Examiner* — Saeed Chaudhry
(74) *Attorney, Agent, or Firm* — Kinney & Lange, P.A.

(57) ABSTRACT

An engine wash system for delivering wash liquid to an engine with a lift fan and a main engine, the lift fan including a plurality of inlet guide vanes and a nose cone, and the main engine connected to the lift fan by a shaft, the engine wash system includes a lift fan manifold to deliver wash liquid to the lift fan; and a main engine manifold to deliver wash liquid to the main engine, wherein the lift fan manifold and the main engine manifold can deliver the wash liquid simultaneously.

22 Claims, 6 Drawing Sheets

ENGINE WASH APPARATUS AND METHOD—MANIFOLD

BACKGROUND

Through use, gas turbine engines become subject to buildup of contaminants on engine components. These contaminants can corrode engine components and affect overall performance of the engine. Engine washing can help to remove these contaminants and improve engine performance and efficiency.

Conventional engine wash processes are accomplished by inserting low pressure injector nozzles into engine ports. These engine ports then deliver a cleaning fluid only to the engine compressor area.

SUMMARY

An engine wash system for delivering wash liquid to an engine with a lift fan and a main engine, the lift fan including a plurality of inlet guide vanes and a nose cone, and the main engine connected to the lift fan by a shaft, the engine wash system includes a lift fan manifold to deliver wash liquid to the lift fan; and a main engine manifold to deliver wash liquid to the main engine, wherein the lift fan manifold and the main engine manifold can deliver the wash liquid simultaneously.

A method of washing an engine with a lift fan and a main engine connected by a shaft includes securing a lift fan manifold to the lift fan by connecting a nose cone ring around a nose cone of the lift fan and engaging a plurality of hooks to a plurality of inlet guide vanes of the lift fan; aligning the lift fan manifold with respect to the lift fan by connecting a guide on a feeder pipe of the lift fan manifold to an inlet guide vane; securing a main engine manifold to the main engine by securing a hinged ring around the shaft of the main engine; aligning the main engine manifold with respect to the main engine by connecting a guide connected to a feeder pipe for the main engine manifold to an inlet guide vane; delivering wash liquid to the feeder pipe on the lift fan manifold; directing the wash liquid toward the lift fan through a plurality of nozzles on the lift fan manifold; delivering wash liquid to the feeder pipe on the main engine manifold; and directing the wash liquid toward the main engine through a plurality of nozzles on the main engine manifold.

DETAILED DESCRIPTION

Figure 1A:
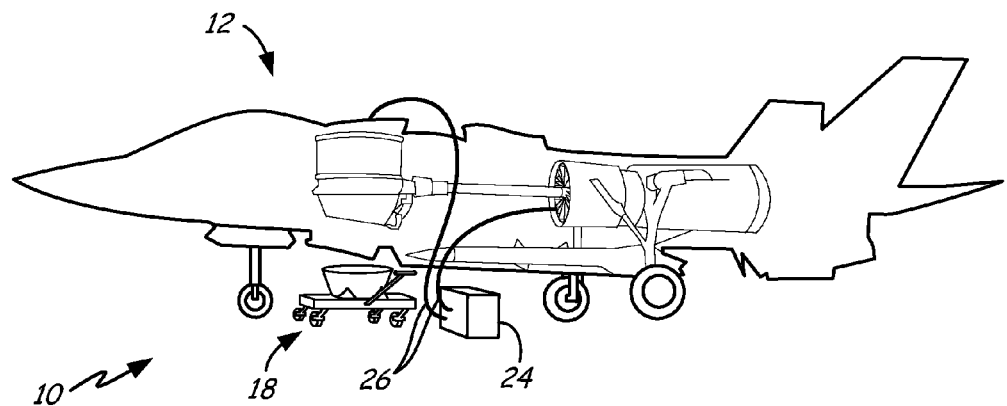
FIG. 1A shows a perspective view of an engine wash apparatus in use on a short take off vertical landing ("STOVL") aircraft.
Figure 1B:
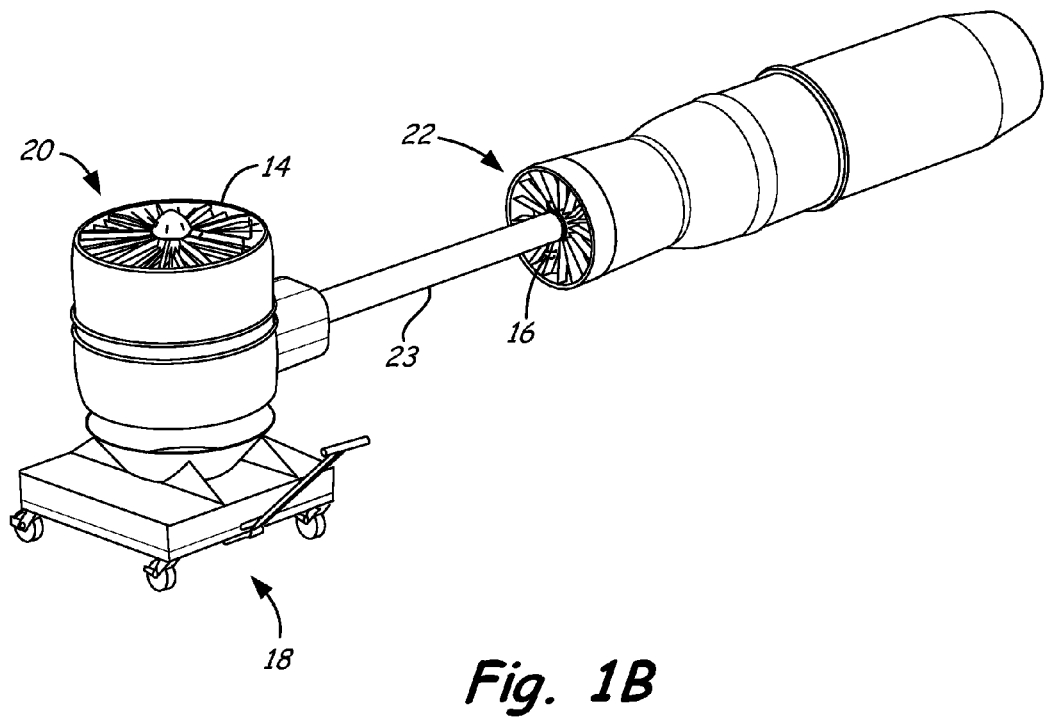
FIG. 1B shows a view of a lift fan and a main engine of the STOVL aircraft of FIG. 1A.

FIG. 1A shows an engine wash system 10 in use on a F135 short take off vertical landing ("STOVL") aircraft 12. FIG. 1B shows a perspective view of manifolds 14, 16 and collector 18 of engine wash system 10 in use with lift fan 20 and main engine 22 of the STOVL aircraft 12. FIGS. 1A-1B include wash system 10 with lift fan manifold 14, main engine manifold 16, collector 18, wash unit 24 and hoses 26.

Lift fan manifold 14 connects to lift fan 20 to direct spray of liquid at lift fan for washing lift fan. Main engine manifold 16 connects to main engine 22 to direct a spray of wash liquid through main engine 22. Hoses 26 connect lift fan manifold 14 and main engine manifold 16 to wash unit 24. Hoses 26 can be secured to aircraft 12 body to ensure it does not get sucked into engine during a cleaning operation. While not shown, collector 18 could connect to engine wash unit 24 to send used wash liquid to wash unit 24 for treatment and/or disposal.

Engine wash unit 24 can include equipment for generating power, storing, heating pumping, delivering, spraying, collecting, treating and filtering wash liquid. This can include hoses, a generator, a heater, a pump and/or manifolds. Engine wash unit 24 can be transported by vehicle, for example, on the bed of a truck or in other ways, making it easy to use on land, on a ship or anywhere else that an engine would need washing.

Wash system 10 with manifolds 14, 16 and collector 18 allow for the washing of both lift fan 20 and main engine 22 simultaneously and enables the collection of wash liquid for disposal or treatment. Wash system 10 provides an effective and efficient washing of STOVL aircraft 12, enabling a more efficient engine while in operation.

Figure 2A:
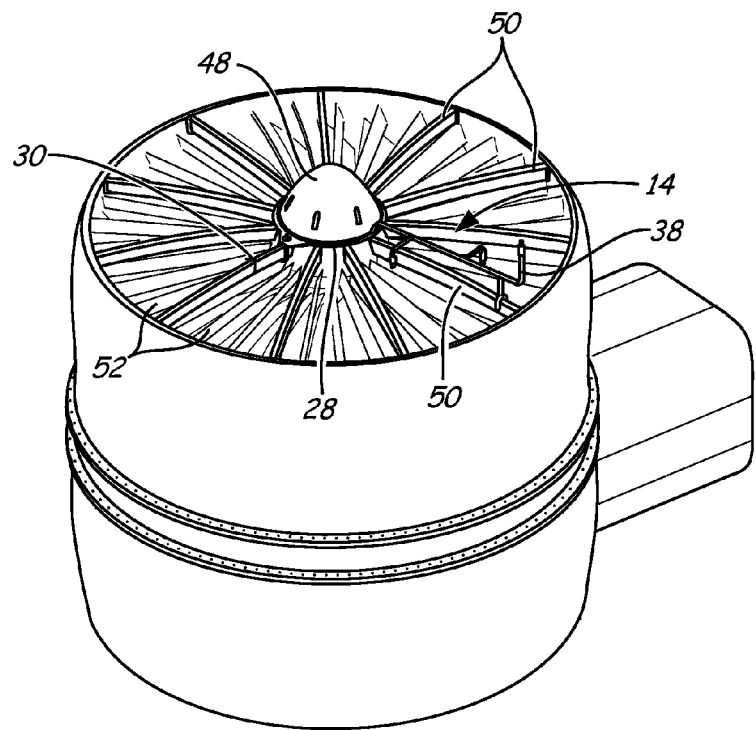
FIG. 2A shows a manifold in use on the lift fan of the STOVL aircraft of FIG. 1A.
Figure 2B:
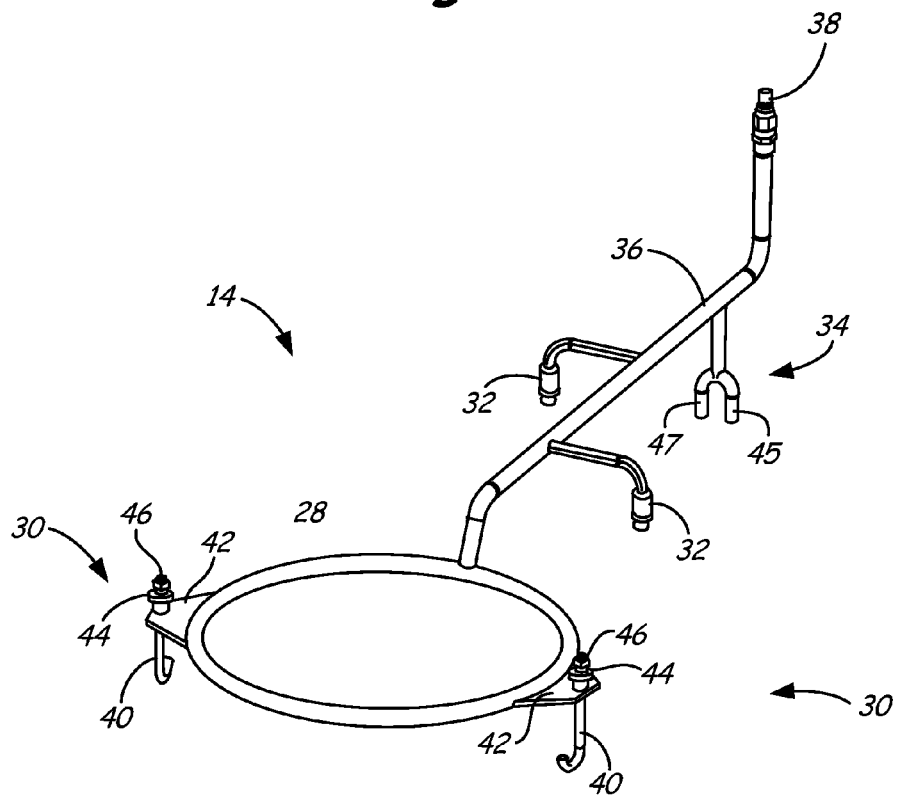
FIG. 2B shows a perspective view of the lift fan manifold of FIG. 2A.

FIG. 2A shows lift fan manifold 14 in use on lift fan 20 of STOVL aircraft 12, and FIG. 2B shows a perspective view of manifold 14. Manifold 14 includes nose cone ring 28, retention hooks 30, nozzles 32, guide 34 and feeder pipe 36 with inlet 38. Retention hooks 30 each include engagement member 40, bracket 42, knurled knob 44 and nut 46. Guide 34 includes first arm 45 and second arm 47. Lift fan 20 includes nose cone 48, inlet guide vanes 50 and lift fan blades 52.

Feeder pipe 36 includes a first end with inlet 38 and a second end that connects to nose cone ring 28. Feeder pipe 36 is hollow to deliver wash liquid from inlet 38 to one or more nozzles 32 connected to feeder pipe 36. Guide 34 connects to feeder pipe 36 and includes first arm 45 and second arm 47 shaped to secure around inlet guide vane 50. Brackets 42 of hooks 30 are secured to nose cone ring 28. Engagement member 40 can move with respect to bracket 42, and is positioned through use of knurled knob 44 and nut 46. Some or all of manifold 14 can be coated with a polymeric coating. The embodiment of lift fan manifold 14 shown includes two nozzles 32 extending from feeder pipe 36. In alternative embodiments, nozzles could be on nose cone ring 28 in addition or as an alternative to nozzles connecting to feeder pipe 36. As shown in FIG. 1A, inlet 38 of feeder pipe can connect to a hose to receive wash fluid.

Lift fan manifold 14 connects to lift fan 20 by connecting nose cone ring 28 around nose cone 48, securing with hooks 30 and aligning with guide 34. Hooks 30 secure to inlet guide vanes 50 by extending engagement members 40 to a proper length to fit around inlet guide vanes. Engagement member 40 are then retracted using knurled knobs 44 to provide a securing force for manifold 14. Nuts 44 are secured to engagement members 40 to provide a captive feature of hooks 30.

Guide 34 is attached to feeder pipe 36 and includes first arm 45 and second arm 47 which extend outwards and away from each other at the ends. The expanded arms 45, 47 allow guide 34 to slide around sides of inlet guide vane 50, properly aligning nozzles 32 and preventing movement of manifold 14 when in a washing operation. Guide 34 is shaped to fit securely around inlet guide vane 50 without interfering with or damaging inlet guide vane 50.

Once connected, lift fan manifold 14 can direct a wash liquid toward lift fan 20. Wash liquid is delivered to manifold 14 through inlet 38 of feeder pipe 36. Wash liquid then travels through hollow feeder pipe 36 of manifold 14 to nozzles 32, where it is directed through lift fan 20. Wash liquid can be heated, deionized water only or could include detergent to help with the cleaning process, depending on system needs and requirements. Wash liquid can be temperature regulated for more efficient washing processes by using a heater to increase the temperature, isopropyl alcohol to keep wash liquid from freezing in cold weather or other means depending on system requirements.

Manifold 14 can effectively and efficiently wash lift fan 20 by securing to nose cone 48. Hooks 30 adjust to fit around inlet guide vanes 50 to provide a securing force, keeping manifold 14 in place on nose cone 48 and resisting the force generated by the wash liquid spray through nozzles 32. Guide 34 aligns manifold 14 properly so that nozzles 32 direct wash liquid as desired for an effective washing operation. Lift fan manifold 14 can provide a successful and efficient wash for lift fan 20, increasing the efficiency and life of lift fan 20.

Figure 3A:
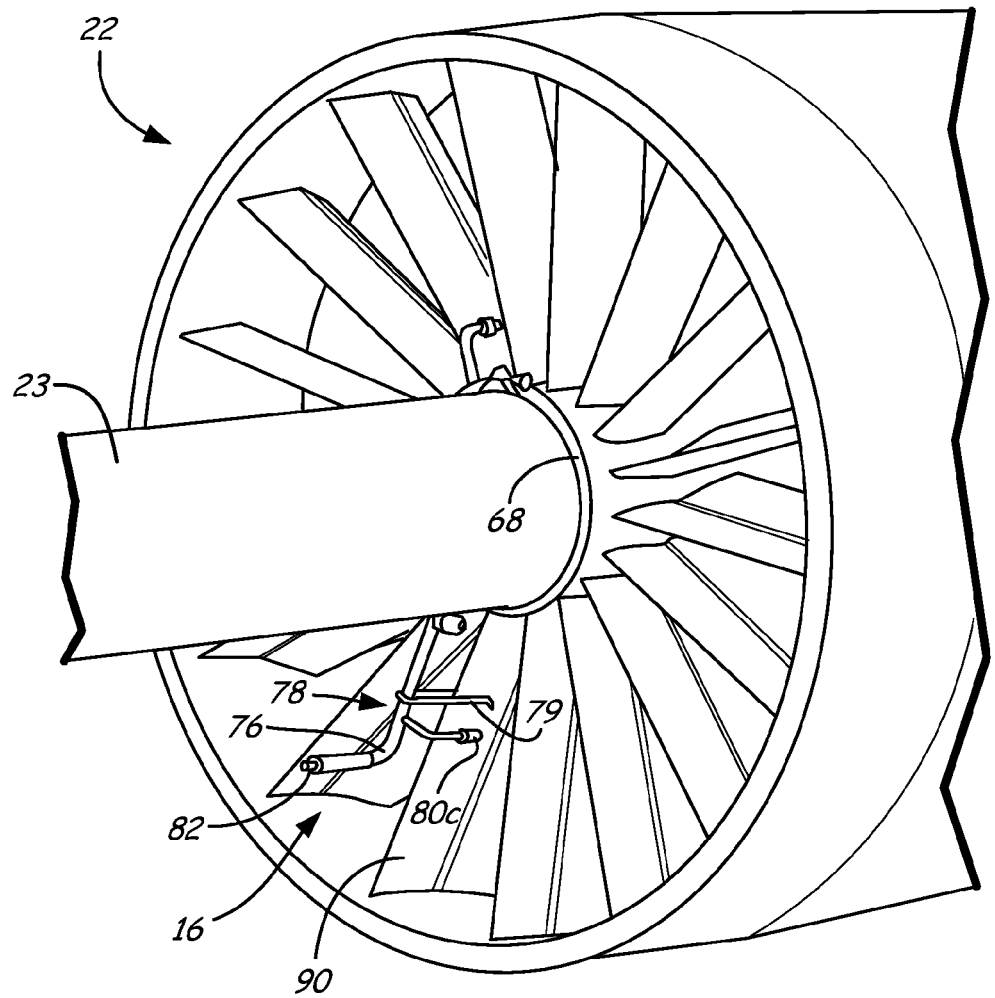
FIG. 3A shows a manifold in use on the main engine of the STOVL aircraft of FIG. 1A.
Figure 3B:
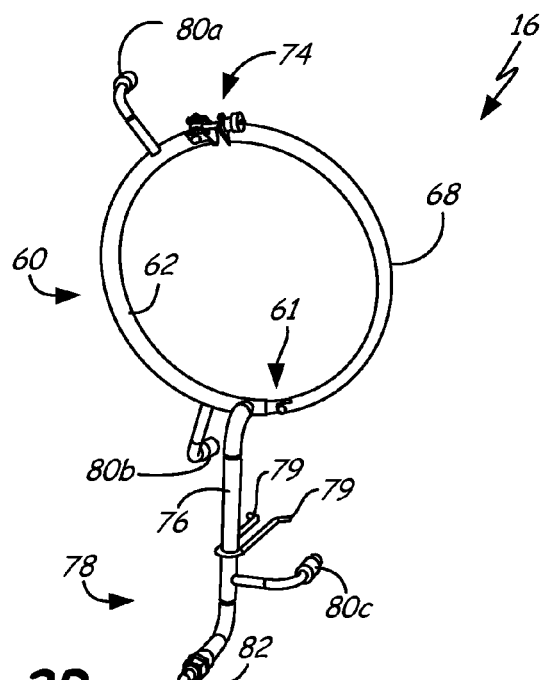
FIG. 3B shows a perspective view of the manifold of FIG. 3A in a closed position.
Figure 3C:
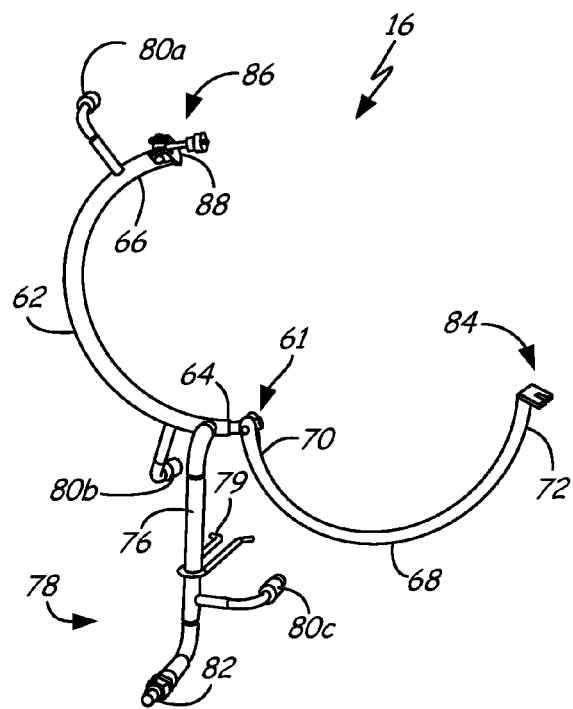
FIG. 3C shows a perspective view of the manifold of FIG. 3A in an open position.

FIG. 3A shows main engine manifold 16 in use on the main engine 22 of the STOVL aircraft 12 of FIG. 1A, FIG. 3B shows a perspective view of main engine manifold 16 in a closed position, and FIG. 3C shows a perspective view of main engine manifold 16 in an open position. Manifold 16 includes hinged ring 60 with hinge 61, first segment 62 (with first end 64 and second end 66), second segment 68 (with first end 70 and second end 72) and retention system 74; feeder pipe 76, guide 78 with arms 79, nozzles 80a, 80b, 80c, and inlet 82. Retention system 74 includes female coupling 84 and male coupling 86 with pin 88. Main engine 22 includes inlet guide vanes 90 and shaft 23.

Feeder pipe 76 includes a first end with inlet 82 and a second end that connects to hinged ring 60. Feeder pipe 76 and at least part of hinged ring 60 are hollow to deliver wash liquid from inlet 82 to nozzles 80a, 80b, 80c. In the embodiment shown, nozzles 80a and 80b are connected to first segment 62 of hinged ring, and therefore only first segment of hinged ring 60 is hollow. This allows for sealing of first end 64 and second end 66 of first segment 62 so that a water-tight connection does not need to be made between first segment 62 and second segment 68.

Guide 78 connects to feeder pipe 76 and includes arms 79 shaped to secure around inlet guide vane 90 without damaging or interfering with inlet guide vane 90. Hinge 61 connects first end 64 of first segment 62 to first end 70 of second segment 68. Retention system 74 releasably connects second end 66 of first segment 62 to second end 72 of second segment 68. This connection is made by female coupling 84 receiving pin 88 of male coupling 86 to close hinged ring 60. Some or all of manifold 16 can be coated with a polymeric coating. The embodiment of engine wash manifold 16 shown includes a plurality of nozzles. Main engine manifold 16 includes short nozzles 80a, 80b connected to hinged ring 60 and long nozzle 80c connected to feeder pipe 76. Alternative embodiments could have a different configuration of nozzles. As shown in FIG. 1A, inlet 82 of feeder pipe 76 can connect to a hose to receive wash fluid.

Main engine manifold 16 connects around shaft 23 (which connects lift fan 20 to main engine 22, see FIG. 1B) of main engine 22 by opening hinged ring 60 to fit around shaft 23, as shown in FIG. 3C. Once around shaft 23, hinged ring 60 is closed by connecting pin 88 of male coupling 86 to female coupling 84. Retention system 74 ensures that hinged ring 60 stays closed to be able to deliver wash liquid to main engine 22 during a washing operation. Guide 78 wraps around feeder pipe 76 and slides around sides of inlet guide vane 90. Guide 78 aligns manifold 16 so that nozzles are properly aligned for washing operation and helps to prevent movement of manifold 16 during washing.

Once connected, main engine manifold 16 can direct a wash liquid toward main engine 22. Wash liquid is delivered to manifold 16 through inlet 82 of feeder pipe 76. Wash liquid then travels through hollow feeder pipe 76 of manifold 16 to nozzle 80c, where a portion of the wash fluid is directed at fan blades to wash off buildup at engine intake, keeping fan blades aerodynamic and efficient. A portion of the wash fluid continues through feeder pipe 76 of manifold 16 to first segment 62 of hinged ring 60. From first segment 62 of hinged ring, it is directed at engine 22 core through nozzles 80a and 80b. This wash fluid can travel along the same airflow path of contaminants. This can clean contaminants and buildup within engine 22, including in the compressor. Nozzles can vary to direct water at different pressures, temperatures and flow rates. Nozzles can also atomize wash liquid. During a wash operation, engine 22 can be motored to assist in flowing wash liquid through engine 22 in the same manner that air and contaminants flow through engine. For washing operations, it may be desirable to motor engine 22 with starter or auxiliary power unit.

Main engine manifold 16 can quickly and easily be connected around shaft 23 of main engine 22 to perform a washing operation by using hinged ring 60. Guide 78 provides an alignment to ensure nozzles 80a, 80b, 80c are properly aligned for an effective engine washing operation. Main engine manifold 16 can help to improve performance and life of main engine 22.

Figure 4A:
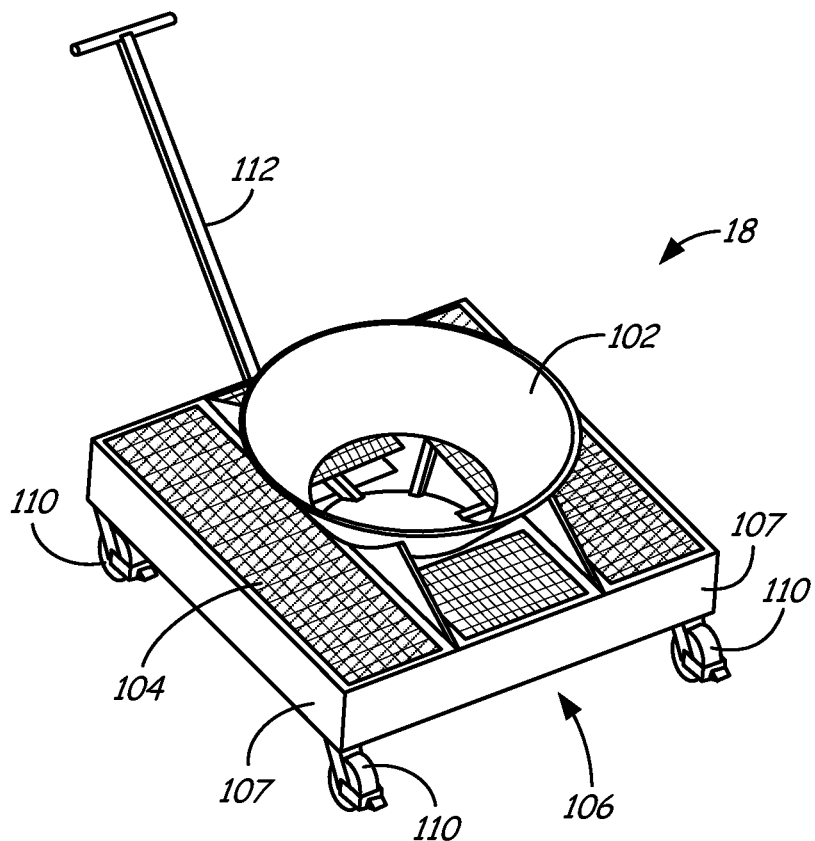
FIG. 4A shows a first embodiment of a collector for use in an engine wash system.
Figure 4B:
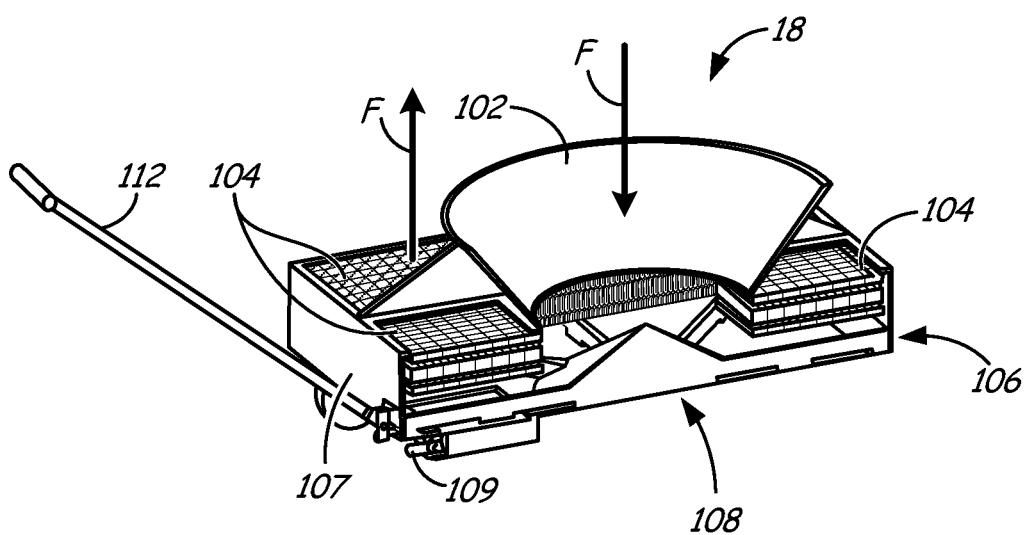
FIG. 4B shows a cross-sectional view of the collector of FIG. 4A.

FIG. 4A shows a first embodiment of collector 18 for use in engine wash system 10 (see FIG. 1A), and FIG. 4B shows a cross-sectional view of collector 18. Collector 18 includes inlet duct 102, horizontal droplet separators 104, base 106 (with vertical side walls 107 and bottom 108), outlet 109, wheels 110 and tow bar 112. Airflow is shown with arrows F.

Inlet duct 102 is cone shaped to fit under lift fan 20 (see FIG. 1A). Inlet duct 102 is connected to base 106. In some embodiments, inlet duct 102 can contact aircraft, can also be compliant and/or can be adjustable. Horizontal droplet separators 104 are connected to base 106. Bottom 108 of base 106 is contoured to direct airflow coming from lift fan 20 towards horizontal droplet separators 104 and to direct liquid collects in collector 18 towards outlet 109. Base 108 contains a cone shaped contour directly beneath inlet duct 102. Tow bar 112 and wheels 110 are connected to base 106. Collector 18 can be made of stainless steel.

When performing a washing operation, lift fan 20 is often cranked, which turns wash fluid into a mist when exiting lift fan 20. This mist may contain contaminants requiring collection of the effluent for proper disposal or treatment. Additionally, this mist may be coming at high speeds, making it difficult to collect in a tarp or other device used on past systems.

Inlet duct 102 can direct this mist into collector 18, where contours on bottom 108 push air flow F upward through horizontal droplet separators 104. Droplet separators 104 remove fluid from mist, allowing air to exit. This used wash fluid is captured in base 106, and can be directed toward outlet 109, where it can flow into a drain through a hose (not shown) or can flow into a system to treat the wash effluent and reclaim clean liquid for washing operations. The treatment system could be located in engine wash unit 24.

Collector 18 acts to capture, separate and contain used wash liquid from lift fan 20 during a washing operation. Collector 18 can be easily moved into place under lift fan 20 with tow bar 112, and wheels 110 can be locked to ensure it does not move during a wash operation. Collector 18 is an effective and efficient way to collect used wash liquid from a cleaning operation.

Figure 5A:
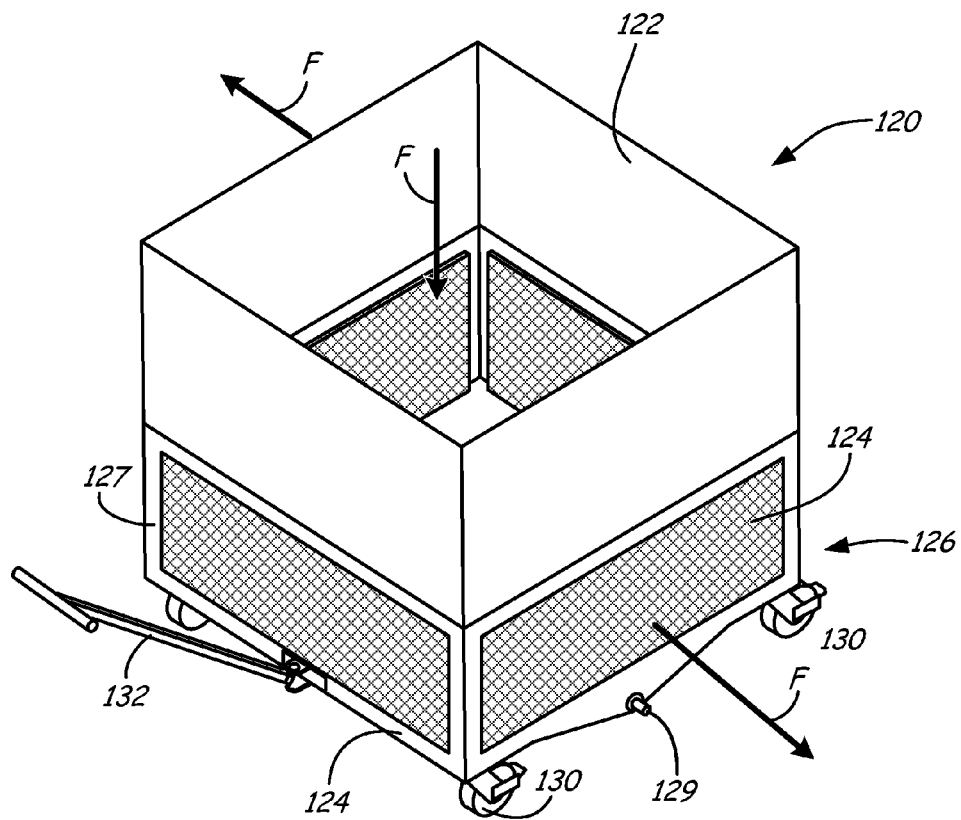
FIG. 5A shows a second embodiment of a collector for use in an engine wash system.
Figure 5B:
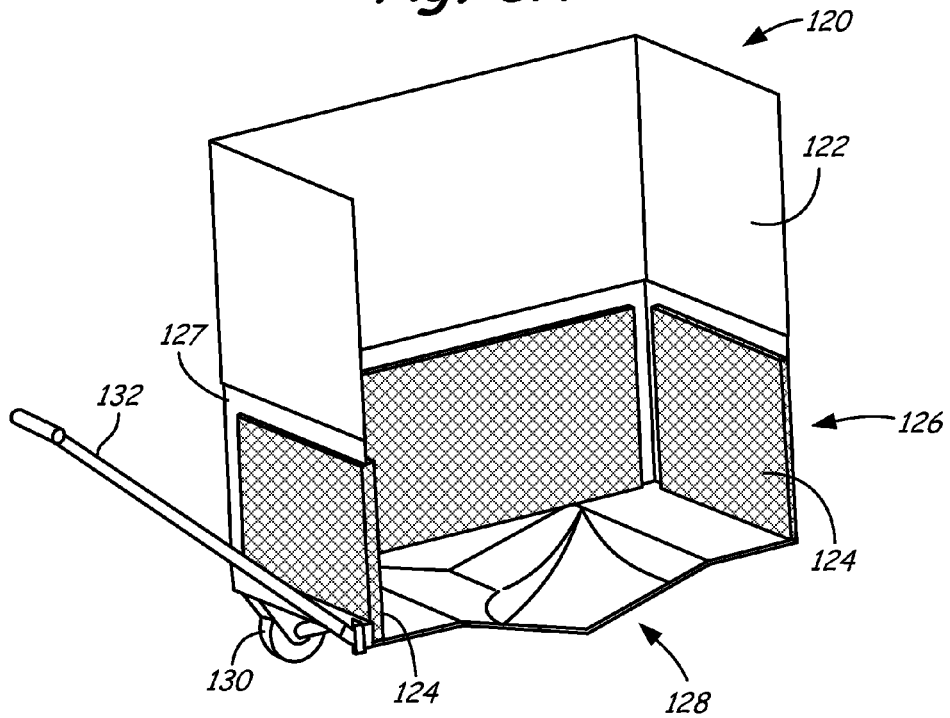
FIG. 5B shows a cross-sectional view of the collector of FIG. 5A.

FIG. 5A shows a second embodiment of a collector 120 for use in an engine wash system, and FIG. 5B shows a cross-sectional view of collector 120. Collector 120 includes inlet duct 122, vertical droplet separators 124, base 126 (with vertical side walls 127 and bottom 128), outlet 129, wheels 130 and tow bar 132. As with collector 18 of FIGS. 4A-4B, inlet duct 122 can have embodiments where it contacts the aircraft, can be compliant and/or can be adjustable.

Collector 120 functions much in the same way as collector 18, sitting beneath lift fan 20 to collected used wash liquid from lift fan 20. However, the droplet separators 124 of collector 120 are vertical droplet separators 124, and are in vertical side walls 127 of base 126. Contours on bottom 128 of base 126 direct airflow F horizontally out the sides of vertical droplet separators 124. Base 126 collects wash liquid that has been separated from mist exiting lift fan 20 during a wash operation and directs it toward outlet 129.

In summary, engine wash system 10 with lift fan manifold 14, main engine manifold 16 and collector 18 (or 120) allow for the washing of both lift fan 20 and main engine 22 simultaneously, while enabling collection of used wash liquid from lift fan 20. Wash unit 24 can connect to both lift fan manifold 14 and main engine manifold 16 to deliver wash fluid and control manifolds 14, 16. Collector 18 (or 120) can capture, separate and dispose of wash liquid coming from lift fan 20. In some embodiments, collector could also connect to wash unit 24, making a closed wash system. Wash system 10 provides an effective and efficient washing of STOVL aircraft 12, enabling a more efficient engine while in operation. Wash system 10 provides a robust and effect wash system for F135 STOVL aircraft 12, that can be a closed loop system (with wash unit 24), which can wash lift fan 20 and engine 22, collect the used wash liquid, and remove contaminants from the used wash liquid to prepare it for reuse in washing operations. Engine wash system 10 is compact and portable, allowing for use wherever needed.

The use of a F135 STOVL engine is for example purposes only, and engine wash manifolds 14, 16 and/or collectors 18, 120 can be used with other aircrafts and/or engines.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. An engine wash system for delivering wash liquid to an engine with a lift fan and a main engine, the lift fan including a plurality of inlet guide vanes and a nose cone, and the main engine connected to the lift fan by a shaft, the engine wash system comprising:
   a lift fan manifold to deliver wash liquid to the lift fan; and
   a main engine manifold to deliver wash liquid to the main engine, wherein the lift fan manifold and the main engine manifold can deliver the wash liquid simultaneously.

2. The engine wash system of claim 1, wherein the lift fan manifold comprises:
   a nose cone ring to secure around the nose cone of the lift fan;
   a feeder pipe for receiving wash liquid and connecting to the nose cone ring;
   a plurality of nozzles connected to the feeder pipe to direct the wash liquid into the lift fan;
   a first hook connected to the nose cone ring to connect to a first inlet guide vane;
   a second hook connected to the nose cone ring to connect to a second inlet guide vane; and
   a guide connected to the feeder pipe to align the lift fan manifold relative to the lift fan.

3. The engine wash system of claim 2, wherein the main engine manifold comprises:
   a hinged ring to connect around the shaft;
   a feeder pipe connecting to the hinged ring to deliver wash liquid to the hinged ring;
   a first nozzle connected to the feeder pipe to direct the wash liquid into the main engine; and
   a guide connected to the feeder pipe to align the main engine manifold relative to the main engine.

4. The engine wash system of claim 3, wherein the hinged ring comprises:
   a first ring segment with a first end and a second end;
   a second ring segment with a first end and a second end;
   a hinge connecting the first end of the first ring segment to the first end of the second ring segment; and
   a retention system to releasably connect the second end of the first ring segment with the second end of the second ring segment.

5. The engine wash system of claim 4, wherein the retention system comprises:
   a male coupling connected to the second end of the first ring segment; and
   a female coupling connected to the first end of the second ring segment to receive the male coupling.

6. The engine wash system of claim 3, and further comprising:
   one or more nozzles connected to the feeder pipe and/or the hinged ring to direct wash liquid to the main engine.

7. The engine wash system of claim 3, and further comprising:
   one or more additional nozzles connected to the hinged ring to direct wash liquid into the main engine.

8. The engine wash system of claim 2, wherein the first hook and the second hook each comprise:
   a bracket connected to nose cone ring;
   an engagement member able to move forward and aft relative to the bracket and to engage an inlet guide vane;
   a nut connecting to the engagement member and able to move forward and aft relative to the bracket; and
   a knurled knob connected to the engagement member to secure the engagement member relative to the bracket.

9. The engine wash system of claim 3, wherein each of the lift fan manifold and the main engine manifold is coated with a polymeric coating.

10. The engine wash system of claim 4, and further comprising:
a wash unit to deliver wash fluid to the feeder pipe of the lift fan manifold and the feeder pipe of the main engine manifold.

11. The engine wash system of claim 4, and further comprising:
a collector for collecting wash liquid from the lift fan during a washing operation.

12. The engine wash system of claim 11, wherein the collector comprises:
an inlet duct to receive wash liquid from the wash operation;
a plurality of droplet separators to retain the wash liquid within the collector while allowing air to flow out of the collector;
a base to receive the wash liquid;
an outlet connected to the base to discharge wash liquid from the collector; and
a plurality of wheels connected to the base for moving the collector.

13. The engine wash system of claim 12, wherein the base includes contours to direct airflow out of the collector through the vertical droplet separators.

14. A system for washing an engine with a main engine and a lift fan connected by a shaft, the system comprising:
a lift fan manifold for directing wash fluid at a lift fan, the lift fan manifold comprising:
a nose cone ring to secure around a nose cone of the lift fan;
a hollow feeder pipe for receiving wash liquid and connecting to the nose cone ring;
a plurality of nozzles connected to the feeder pipe to direct the wash liquid into the lift fan;
a hook connected to the ring to connect to a first inlet guide vane; and
a guide connected to the feeder pipe to align the lift fan manifold relative to the lift fan;
a main engine manifold for directing wash fluid at a main engine, the main engine manifold comprising:
a hinged ring to connect around the shaft;
a feeder pipe connecting to the hinged ring to deliver wash liquid to the hinged ring;
a first nozzle connected to the feeder pipe to direct the wash liquid into the main engine;
a plurality of nozzles connected to the hinged ring to deliver wash liquid to the engine; and
a guide connected to the feeder pipe to align the main engine manifold relative to the main engine.

15. The system of claim 14, and further comprising:
a wash unit to deliver wash fluid to the feeder pipe of the lift fan manifold and the feeder pipe of the main engine manifold.

16. The system of claim 15, and further comprising:
a collector for collecting wash liquid from the lift fan during a washing operation.

17. The engine wash system of claim 16, wherein the collector comprises:
an inlet duct to receive wash liquid from the wash operation;
a plurality of vertical droplet separators to retain the wash liquid within the collector while allowing air to flow out of the collector;
a base to receive the wash liquid;
an outlet connected to the base to discharge wash liquid from the collector; and
a plurality of wheels connected to the base for moving the collector; and
a towbar connected to the base.

18. A method of washing an engine with a lift fan and a main engine connected by a shaft, the method comprising:
securing a lift fan manifold to the lift fan by connecting a nose cone ring around a nose cone of the lift fan and engaging a plurality of hooks to a plurality of inlet guide vanes of the lift fan;
aligning the lift fan manifold with respect to the lift fan by connecting a guide on a feeder pipe of the lift fan manifold to an inlet guide vane;
securing a main engine manifold to the main engine by securing a hinged ring around the shaft of the main engine;
aligning the main engine manifold with respect to the main engine by connecting a guide connected to a feeder pipe for the main engine manifold to an inlet guide vane;
delivering wash liquid to the feeder pipe on the lift fan manifold;
directing the wash liquid toward the lift fan through a plurality of nozzles on the lift fan manifold;
delivering wash liquid to the feeder pipe on the main engine manifold; and
directing the wash liquid toward the main engine through a plurality of nozzles on the main engine manifold.

19. The method of claim 18, and further comprising:
collecting the wash liquid exiting the lift fan with a collector.

20. The method of claim 19, and further comprising:
using a mobile wash unit to deliver wash liquid to the lift fan manifold and to the main engine manifold feeder pipes simultaneously.

21. The method of claim 19, and further comprising:
treating the collected wash liquid.

22. The method of claim 21, and further comprising:
delivering the treated wash liquid back to the manifold inlet to be used for washing.

* * * * *